US009771067B2

(12) United States Patent
Hokoi et al.

(10) Patent No.: US 9,771,067 B2
(45) Date of Patent: Sep. 26, 2017

(54) HYBRID VEHICLE

(71) Applicant: TOYOTA JIDOSHA KABUSHIKI KAISHA, Toyota-shi, Aichi-ken (JP)

(72) Inventors: Koji Hokoi, Toyota (JP); Takaharu Hori, Anjo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/353,190

(22) Filed: Nov. 16, 2016

(65) Prior Publication Data

US 2017/0144652 A1 May 25, 2017

(30) Foreign Application Priority Data

Nov. 20, 2015 (JP) ................. 2015-228066

(51) Int. Cl.
| | |
|---|---|
| *B60W 10/06* | (2006.01) |
| *B60W 10/08* | (2006.01) |
| *B60W 20/50* | (2016.01) |
| *B60K 6/365* | (2007.10) |
| *B60K 6/383* | (2007.10) |
| *B60L 15/00* | (2006.01) |
| *B60K 6/28* | (2007.10) |
| *B60W 20/20* | (2016.01) |

(52) U.S. Cl.
CPC ............. *B60W 20/50* (2013.01); *B60K 6/28* (2013.01); *B60K 6/365* (2013.01); *B60K 6/383* (2013.01); *B60L 15/007* (2013.01); *B60W 10/06* (2013.01); *B60W 10/08* (2013.01); *B60W 20/20* (2013.01); *B60W 2510/0638* (2013.01); *B60W 2510/081* (2013.01); *B60W 2710/083* (2013.01); *B60Y 2200/92* (2013.01); *Y10S 903/91* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 2002/0017406 A1 | 2/2002 | Hisada | |
| 2007/0151783 A1* | 7/2007 | Yamauchi | ................ B60K 5/08 180/65.31 |

(Continued)

FOREIGN PATENT DOCUMENTS

| | | |
|---|---|---|
| JP | 2002-12046 | 1/2002 |
| JP | 3951562 | 8/2007 |
| JP | 2013-154748 | 8/2013 |

*Primary Examiner* — Edwin A Young
(74) *Attorney, Agent, or Firm* — Finnegan, Henderson, Farabow, Garrett & Dunner, LLP

(57) ABSTRACT

In motor double-drive mode, a first rotation speed and a second rotation speed as a drive shaft rotation speed are calculated from rotation speeds of motors on the assumption that an engine rotation speed is zero. A state where a difference between the first rotation speed and the second rotation speed is larger than a threshold continues, and, when a malfunction counter becomes larger than a threshold, it is determined that there is a malfunction in a one-way clutch or pinion gears. At a start of the engine, it is determined that there is a malfunction in the one-way clutch when the engine rotation speed is normally increasing, and it is determined that there is a malfunction in the pinion gears when the engine rotation speed is not normally increasing.

6 Claims, 12 Drawing Sheets

(56) References Cited

U.S. PATENT DOCUMENTS

2014/0058640 A1* 2/2014 Saito .................... B60K 6/445
   701/70
2014/0067180 A1* 3/2014 Tagawa ................ B60K 6/445
   701/22

* cited by examiner

HYBRID VEHICLE

INCORPORATION BY REFERENCE

The disclosure of Japanese Patent Application No. 2015-228066 filed on Nov. 20, 2015 including the specification, drawings and abstract is incorporated herein by reference in its entirety.

BACKGROUND

1. Technical Field

The present disclosure relates to a hybrid vehicle and, more particularly, to a hybrid vehicle including an engine, a first motor, a second motor and a planetary gear mechanism.

2. Description of Related Art

Conventionally, there is suggested a hybrid vehicle including a one-way clutch that is free when an engine rotates in a forward direction and that locks when the engine intends to rotate in a reverse direction (see, for example, Japanese Patent Application Publication No. 2002-012046 (JP 2002-012046 A). In this hybrid vehicle, when an engine rotation speed is a negative value, it is determined that there is a malfunction in the one-way clutch. The hybrid vehicle includes a planetary gear and a drive motor. The planetary gear includes a ring gear coupled to a drive wheel via a gear mechanism, or the like, a sun gear connected to a generator motor, and a carrier connected to an output shaft of the engine. The drive motor is connected to the gear mechanism connected to the ring gear. The one-way clutch is connected to the output shaft of the engine. In this vehicle, when torque in a direction to rotate the engine in the reverse direction is output from the generator motor in a state where the operation of the engine is stopped, the torque is supported by the one-way clutch, so it is possible to output torque as reaction force to the ring gear. Through operation in this way, the vehicle travels by torque output from the generator motor and torque output from the drive motor.

SUMMARY

Generally, a sensor that detects the rotation speed of an engine is not able to determine whether a rotation direction is positive or negative, so it is required to use a sensor that is able to determine whether the rotation direction is positive or negative in order to detect that the engine rotation speed is a negative value as in the case of the above-described hybrid vehicle. If such a sensor is used, cost increases.

The present disclosure provides a hybrid vehicle that further properly determines a malfunction in a rotation restriction mechanism, such as a one-way clutch, a planetary gear train, or the like.

An aspect of the present disclosure provides a hybrid vehicle. The hybrid vehicle includes an engine, a first motor, a second motor, a planetary gear train, a rotation restriction mechanism, a battery, and an electronic control unit. The planetary gear train includes a planetary gear, and rotating elements of the planetary gear train are connected to the engine, the first motor, the second motor and a drive shaft coupled to an axle. The rotation restriction mechanism is configured to restrict rotation of the engine. The battery is configured to exchange electric power with the first motor and the second motor. The electronic control unit is configured to i) in double-drive mode in which the hybrid vehicle travels by using torque from the first motor and the second motor in a state where the rotation of the engine is restricted, control the first motor and the second motor such that a required torque that is required for the drive shaft is output from the first motor and the second motor to the drive shaft, and ii) in the double-drive mode, when a deviation between a first rotation speed of the drive shaft, calculated from a rotation speed of the first motor at the time when the rotation of the engine is restricted, and a second rotation speed of the drive shaft, calculated from a rotation speed of the second motor, is larger than a threshold, determine that there is a malfunction in any one of the planetary gear train and the rotation restriction mechanism.

In the above-described hybrid vehicle, while the hybrid vehicle is traveling in the double-drive mode in which the hybrid vehicle travels by using torque from the first motor and the second motor in a state where the rotation of the engine is restricted, the rotation speed (first rotation speed) of the drive shaft is calculated from the rotation speed of the first motor at the time when the rotation of the engine is restricted, and the rotation speed (second rotation speed) of the drive shaft is calculated from the rotation speed of the second motor. When the deviation between the first rotation speed and the second rotation speed is larger than the threshold, it is determined that there is a malfunction in any one of the planetary gear train and the rotation restriction mechanism that restricts the rotation of the engine. When the rotation restriction mechanism or the planetary gear mechanism is normally operating, the first rotation speed and the second rotation speed coincide with each other within an allowable range of sensor errors, or the like. Therefore, when the deviation between the first rotation speed and the second rotation speed is larger than the threshold set in advance as a value close to the upper limit of the allowable range, it may be determined that there is a malfunction in the rotation restriction mechanism or the planetary gear train. Thus, it is possible to further properly determine a malfunction in the rotation restriction mechanism or the planetary gear train. The deviation between the first rotation speed and the second rotation speed means the absolute value of a difference between the first rotation speed and the second rotation speed.

In the thus configured hybrid vehicle, the planetary gear train may include a single pinion planetary gear. The single pinion planetary gear may include a sun gear coupled to the first motor, a ring gear coupled to the drive shaft, and a carrier coupled to a plurality of pinion gears and coupled to the engine. The electronic control unit may be configured to, when the first rotation speed is higher than the second rotation speed by the threshold or more, determine that there is a malfunction in the rotation restriction mechanism or the pinion gears.

In the hybrid vehicle configured to include the single pinion planetary gear, the rotation restriction mechanism may be a one-way clutch that permits forward rotation of the engine and does not permit reverse rotation of the engine. The electronic control unit may be configured to, at the time when the electronic control unit starts the engine after determining that there is a malfunction in any one of the rotation restriction mechanism and the pinion gears, i) determine that there is a malfunction in the one-way clutch when a difference between a rotation speed, calculated from the rotation speed of the first motor and the rotation speed of the second motor, and a rotation speed of the engine is smaller than or equal to a predetermined difference, and ii) determine that there is a malfunction in the pinion gears when the difference is larger than the predetermined difference.

In the above-described hybrid vehicle, in the case of a malfunction in the one-way clutch (malfunction in the clutch function), the first rotation speed increases because the engine is rotated toward a reverse rotation side in the double-drive mode; however, the engine is normally rotated toward a forward rotation side at a start of the engine, so the engine rotation speed normally increases. For this reason, the difference between the rotation speed of the engine and the rotation speed of the engine, calculated from the rotation speed of the first motor and the rotation speed of the second motor, falls within the allowable range (predetermined difference) due to sensor errors, or the like. On the other hand, in the case of a malfunction (idling malfunction) in the pinion gears, the first rotation speed increases because of idling of the pinion gears in the double-drive mode, the engine rotation speed does not normally increase because of idling of the pinion gears at a start of the engine as well. For this reason, the difference between the rotation speed of the engine and the rotation speed of the engine, calculated from the rotation speed of the first motor and the rotation speed of the second motor, falls outside the allowable range (predetermined difference). On the basis of this fact, a malfunction in the one-way clutch and a malfunction in the pinion gears are distinguished from each other. Thus, it is possible to further properly determine a malfunction in the one-way clutch and a malfunction in the pinion gears.

In this case, the electronic control unit may be configured to i) when it is determined that there is a malfunction in the one-way clutch, permit hybrid mode and single-drive mode, the hybrid mode is a mode in which the hybrid vehicle travels by using power from the engine and torque from the first motor and the second motor while the double-drive mode is prohibited, the single-drive mode is a mode in which the hybrid vehicle travels by using torque from only the second motor while the engine is placed in a rotation stopped state, and ii) when it is determined that there is a malfunction in the pinion gears, permit the single-drive mode while the double-drive mode and the hybrid mode are prohibited. Thus, the hybrid vehicle is able to travel without a breakage of other components in the event of a malfunction in the one-way clutch (malfunction in the clutch function) or a malfunction in the pinion gears (idling malfunction).

In the hybrid vehicle configured to include the single pinion planetary gear, the planetary gear train may include a reduction gear coupled to the second motor and the ring gear. The electronic control unit may be configured to, when the first rotation speed is lower than the second rotation speed by the threshold or more, determine that there is a malfunction in the reduction gear. Thus, it is possible to determine a malfunction in the reduction gear provided in the planetary gear train.

In this case, when the electronic control unit determines that there is a malfunction in the reduction gear, the electronic control unit may be configured to prohibit a drive mode except an engine motor drive mode and a first motor single-drive mode. The engine motor drive mode may be a mode in which the hybrid vehicle travels by using power from the engine and torque from the first motor. The first motor single-drive mode may be a mode in which the hybrid vehicle travels by using torque from only the first motor. Thus, the hybrid vehicle is able to travel without a breakage of other components in the event of a malfunction in the reduction gear.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments of the present disclosure will be described.

Figure 1:
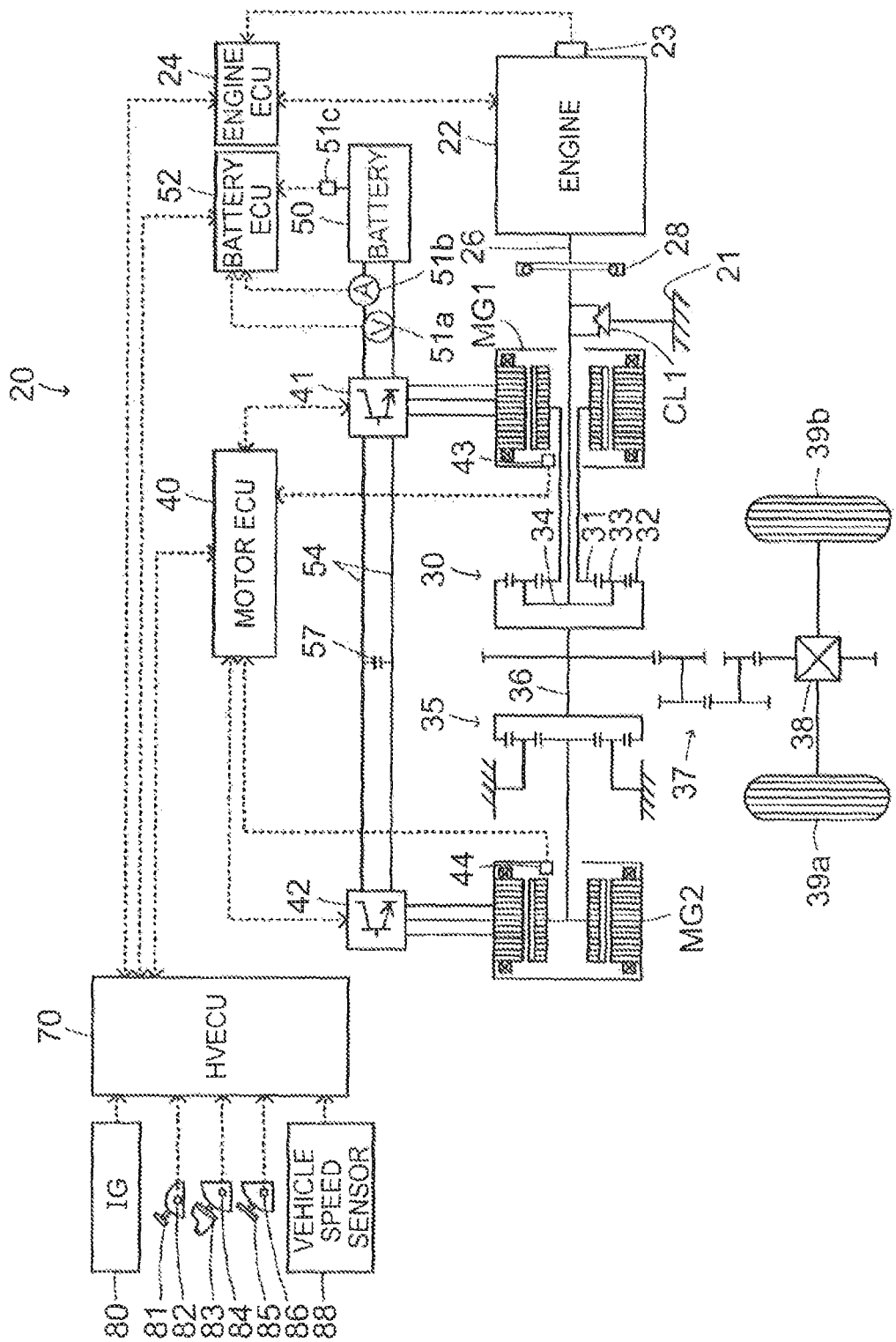
FIG. 1 is a configuration view that schematically shows the configuration of a hybrid vehicle according to a first embodiment of the present disclosure.

FIG. 1 is a configuration view that schematically shows the configuration of a hybrid vehicle 20 according to a first embodiment of the present disclosure.

As shown in FIG. 1, the hybrid vehicle 20 according to the first embodiment includes an engine 22, a planetary gear 30, a one-way clutch CL1, motors MG1, MG2, inverters 41, 42, a battery 50 and a hybrid electronic control unit (hereinafter, referred to as HV-ECU) 70.

The engine 22 is configured as an internal combustion engine that outputs power by using gasoline, light oil, or the like, as fuel. The engine 22 undergoes operation control that is executed by an engine electronic control unit (hereinafter, referred to as engine ECU) 24.

Although not shown in the drawing, the engine ECU 24 is a microprocessor that mainly includes a CPU and that further includes a ROM, a RAM, input/output ports and a communication port in addition to the CPU. The ROM stores a processing program. The RAM temporarily stores data.

Signals from various sensors, which are required to execute operation control over the engine 22, are input to the engine ECU 24 via the input port. Part of the signals that are input from the various sensors include a crank angle θcr and a throttle opening degree TH. The crank angle θcr is input from a crank position sensor 23 that detects a rotation position of a crankshaft 26 of the engine 22. The throttle opening degree TH is input from a throttle valve position sensor that detects a position of a throttle valve.

Various control signals for operation control over the engine 22 are output from the engine ECU 24 via the output port. Part of the various control signals include a drive control signal that is output to a throttle motor that adjusts the position of the throttle valve, a drive control signal that is output to a fuel injection valve, and a drive control signal that is output to an ignition coil integrated with an ignitor.

The engine ECU 24 is connected to the HV-ECU 70 via the communication port. The engine ECU 24 executes operation control over the engine 22 in response to a control signal from the HV-ECU 70. The engine ECU 24, where necessary, outputs data regarding the operating state of the engine 22 to the HV-ECU 70. The engine ECU 24 computes an angular velocity and rotation speed of the crankshaft 26, that is, an angular velocity ωne and rotation speed Ne of the engine 22, on the basis of the crank angle θcr from the crank position sensor 23.

The planetary gear 30 is a single pinion planetary gear mechanism. The planetary gear 30 includes a sun gear 31, a ring gear 32, a plurality of pinion gears 33 and a carrier 34. The sun gear 31 is an external gear. The ring gear 32 is an internal gear. The plurality of pinion gears 33 are in mesh with the sun gear 31 and the ring gear 32. The carrier 34 supports the plurality of pinion gears 33 such that each pinion gear 33 is rotatable and revolvable. The rotor of the motor MG1 is connected to the sun gear 31. A drive shaft 36 is connected to the ring gear 32. The drive shaft 36 is coupled to drive wheels 39a, 39b via a differential gear 38 and a gear mechanism 37. The crankshaft 26 of the engine 22 is connected to the carrier 34 via a damper 28. Lubricating oil is supplied to the planetary gear 30 by an oil pump (not shown). Lubricating oil is also supplied to the pinion gears 33 by the rotation of the carrier 34, or the like.

The one-way clutch CL1 is connected to the carrier 34 and also connected to the case 21 fixed to a vehicle body. The one-way clutch CL1 permits only the rotation of the carrier 34 in the forward rotation direction of the engine 22 with respect to the case 21.

The motor MG1 is, for example, a synchronous generator-motor. As described above, the rotor of the motor MG1 is connected to the sun gear 31 of the planetary gear 30. The motor MG2 is, for example, a synchronous generator-motor. The rotor of the motor MG2 is connected to the drive shaft 36 via a reduction gear 35. The inverters 41, 42 are connected to power lines 54 together with the battery 50. A smoothing capacitor 57 is connected to the power lines 54. Each of the motors MG1, MG2 is driven to rotate under switching control over a plurality of switching elements (not shown) of a corresponding one of the inverters 41, 42, which is executed by a motor electronic control unit (hereinafter, referred to as motor ECU) 40.

Although not shown in the drawing, the motor ECU 40 is a microprocessor that mainly includes a CPU and that further includes a ROM, a RAM, input/output ports and a communication port in addition to the CPU. The ROM stores a processing program. The RAM temporarily stores data.

Signals from various sensors, which are required to execute drive control over the motors MG1, MG2, are input to the motor ECU 40 via the input port. Part of the signals from the various sensors include rotation positions θm1, θm2 and phase currents. The rotation position θm1 is input from a rotation position detection sensor 43 that detects the rotation position of the rotor of the motor MG1. The rotation position θm2 is input from a rotation position detection sensor 44 that detects the rotation position of the rotor of the motor MG2. The phase currents are input from current sensors that respectively detect currents respectively flowing through the phases of each of the motors MG1, MG2.

Switching control signals, and the like, are output from the motor ECU 40 to switching elements (not shown) of the inverters 41, 42.

The motor ECU 40 is connected to the HV-ECU 70 via the communication port. The motor ECU 40 executes drive control over the motors MG1, MG2 in response to a control signal from the HV-ECU 70. The motor ECU 40, where necessary, outputs data regarding the driving states of the motors MG1, MG2 to the HV-ECU 70. The motor ECU 40 computes the rotation speed Nm1 of the motor MG1 on the basis of the rotation position θm1 of the rotor of the motor MG1 from the rotation position detection sensor 43, and computes the rotation speed Nm2 of the motor MG2 on the basis of the rotation position θm2 of the rotor of the motor MG2 from the rotation position detection sensor 44.

The battery 50 is, for example, a lithium ion secondary battery or a nickel-metal hydride secondary battery. As described above, the battery 50 is connected to the power lines 54 together with the inverters 41, 42. The battery 50 is managed by a battery electronic control unit (hereinafter, referred to as battery ECU) 52.

Although not shown in the drawing, the battery ECU 52 is a microprocessor that mainly includes a CPU and that further includes a ROM, a RAM, input/output ports and a communication port in addition to the CPU. The ROM stores a processing program. The RAM temporarily stores data.

Signals from various sensors, which are required to manage the battery 50, are input to the battery ECU 52 via the input port. Part of the signals from the various sensors includes a battery voltage Vb, a battery current Ib (the battery current Ib is a positive value when the battery 50 is discharged), and a battery temperature Tb. The battery voltage Vb is output from a voltage sensor 51a installed between the terminals of the battery 50. The battery current Ib is output from a current sensor 51b connected to the output terminal of the battery 50. The battery temperature Tb is output from a temperature sensor 51c connected to the battery 50.

The battery ECU 52 is connected to the HV-ECU 70 via the communication port. The battery ECU 52, where necessary, outputs data regarding the state of the battery 50 to the HV-ECU 70. The battery ECU 52 computes a charging and discharging power Pb as a product of the battery voltage Vb from the voltage sensor 51a and the battery current Ib from the current sensor 51b. The battery ECU 52 computes a state of charge SOC on the basis of an accumulated value of the battery current Ib from the current sensor 51b. The state of charge SOC is the percentage of the capacity of dischargeable electric power from the battery 50 to the total capacity of the battery 50.

Although not shown in the drawing, the HV-ECU 70 is a microprocessor that mainly includes a CPU and that further includes a ROM, a RAM, input/output ports and a communication port in addition to the CPU. The ROM stores a processing program. The RAM temporarily stores data.

Signals from various sensors are input to the HV-ECU 70 via the input port. Part of the signals from the various sensors includes an ignition signal, a shift position SP, an accelerator operation amount Ace, a brake pedal position BP and a vehicle speed V. The ignition signal is output from an ignition switch 80. The shift position SP is output from a shift position sensor 82 that detects the operating position of a shift lever 81. The accelerator operation amount Ace is output from an accelerator pedal position sensor 84 that detects the depression amount of an accelerator pedal 83. The brake pedal position BP is output from a brake pedal position sensor 86 that detects the depression amount of a brake pedal 85. The vehicle speed V is output from a vehicle speed sensor 88.

As described above, the HV-ECU 70 is connected to the engine ECU 24, the motor ECU 40 and the battery ECU 52 via the communication port. The HV-ECU 70 exchanges various control signals and data with the engine ECU 24, the motor ECU 40 and the battery ECU 52.

The thus configured hybrid vehicle 20 according to the first embodiment travels in hybrid drive mode (HV drive mode) or electric drive mode (EV drive mode). The HV drive mode is a drive mode in which the hybrid vehicle 20 travels by using power from the engine 22, the motor MG1 and the motor MG2. The EV drive mode is a drive mode in which the operation of the engine 22 is stopped and the hybrid vehicle 20 travels by using power from at least the motor MG1 and the motor MG2. The EV drive mode includes a motor single-drive mode and a motor double-drive mode. In the motor single-drive mode, no torque is output from the motor MG1, and the hybrid vehicle 20 travels by using torque from only the motor MG2. In the motor double-drive mode, the hybrid vehicle 20 travels by using torque from the motor MG1 and torque from the motor MG2.

Figure 2:
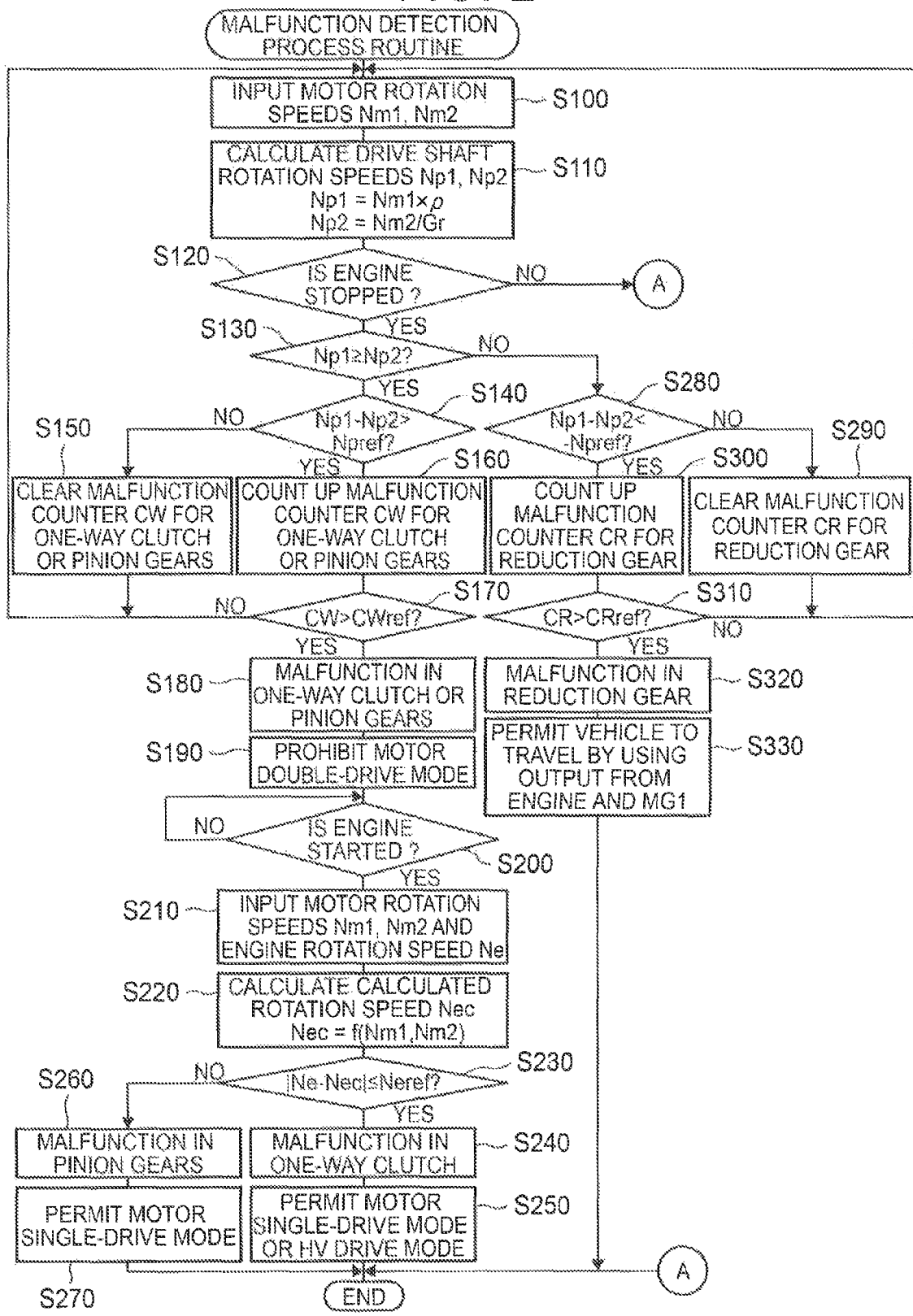
FIG. 2 is a flowchart that shows an example of a malfunction detection process routine that is executed in motor double-drive mode.

Next, the operation of the thus configured hybrid vehicle 20 according to the first embodiment, particularly, the operation to determine whether there is a malfunction in the one-way clutch CL1, the pinion gears 33 or the reduction gear 35 while the hybrid vehicle 20 is traveling in the motor double-drive mode, will be described. FIG. 2 is a flowchart that shows an example of a malfunction detection process routine that is executed by the HV-ECU 70 according to the first embodiment. This routine is executed when the motor double-drive mode is set as the drive mode and a stop of the operation of the engine 22 is determined.

As the malfunction detection process routine is executed, the HV-ECU 70 initially inputs the rotation speeds Nm1, Nm2 of the motors MG1, MG2 (step S100). A value computed on the basis of the rotation position θm1 of the rotor of the motor MG1 from the rotation position detection sensor 43 is allowed to be input from the motor ECU 40 via communication. A value computed on the basis of the rotation position θm2 of the rotor of the motor MG2 from the rotation position detection sensor 44 is allowed to be input from the motor ECU 40 via communication.

Figure 3:
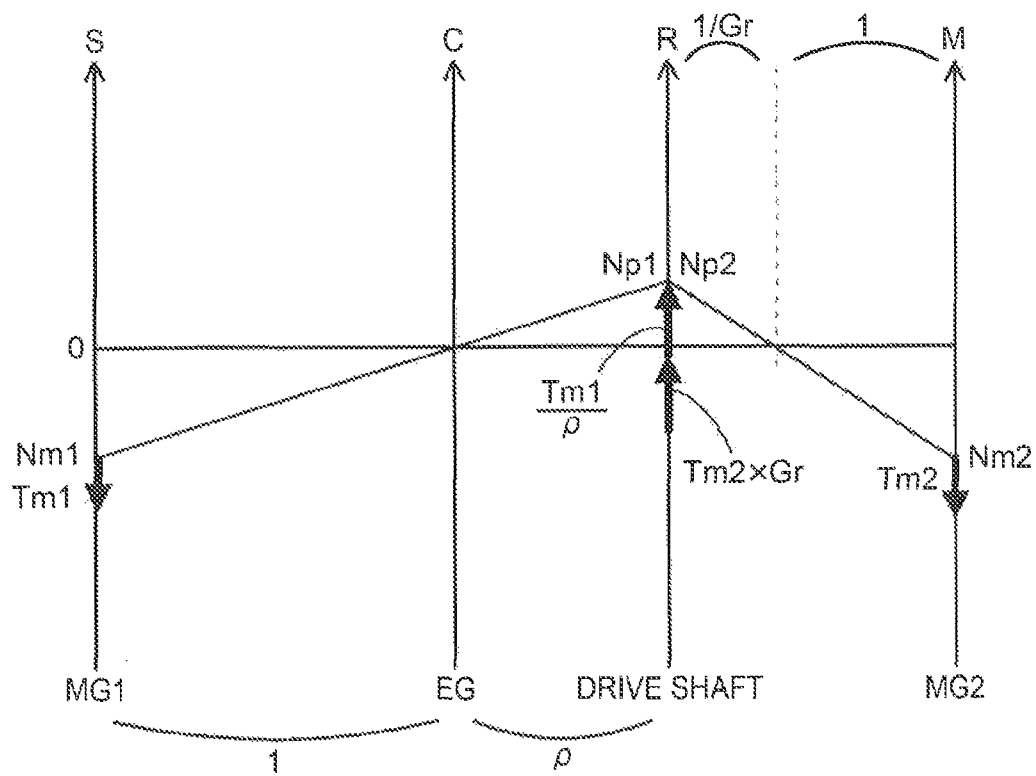
FIG. 3 is a view that illustrates an example of a nomograph at the time when the hybrid vehicle is traveling in the motor double-drive mode.

Subsequently, on the assumption that the rotation speed Ne of the engine 22 is zero, a first rotation speed Np1 as the rotation speed of the drive shaft 36 is calculated from the rotation speed Nm1 of the motor MG1, and a second rotation speed Np2 as the rotation speed of the drive shaft 36 is calculated from the rotation speed Nm2 of the motor MG2 (step S110). FIG. 3 shows an example of a nomograph at the time when the hybrid vehicle 20 is traveling in the motor double-drive mode. In the graph, the left S-axis represents the rotation speed of the sun gear 31 and the rotation speed Nm1 of the motor MG1, the C-axis represents the rotation speed of the carrier 34 and the rotation speed Ne of the engine 22, the R-axis represents the rotation speed of the ring gear 32 and the rotation speed Np of the drive shaft 36, and the right-end M-axis represents the rotation speed of a gear before reduction at the reduction gear 35 and the rotation speed Nm2 of the motor MG2. The wide-line arrow on the S-axis indicates a torque that is output from the motor MG1, the wide-line arrow on the M-axis indicates a torque that is output from the motor MG2, and the two wide-line arrows on the R-axis respectively indicate a torque that is output from the motor MG1 to the drive shaft 36 and a torque that is output from the motor MG2 to the drive shaft 36. $\rho$ denotes the gear ratio (Number of teeth of the sun gear 31/Number of teeth of the ring gear 32) of the planetary gear 30. Gr denotes the gear ratio of the reduction gear 35. As is apparent from the nomograph, the first rotation speed Np1 is allowed to be calculated as a product (Nm1×$\rho$) of the rotation speed Nm of the motor MG1 and the gear ratio $\rho$, and the second rotation speed Np2 is allowed to be calculated as a product (Nm2/Gr) of the rotation speed Nm2 of the motor MG2 and the inverse of the gear ratio Gr. The thus calculated first rotation speed Np1 and second rotation speed Np2 coincide with each other within an allowable range of sensor errors, and the like, when there is no malfunction in the one-way clutch CL1, the planetary gear 30 or the reduction gear 35.

Subsequently, it is determined whether the operation of the engine 22 is stopped (step S120). When the operation of the engine 22 is not stopped (the engine 22 is in operation), it is determined that the drive mode has been changed from the motor double-drive mode to another drive mode (for example, the HV drive mode), after which the routine is ended. It is determined that the motor double-drive mode is being continued when the operation of the engine 22 is stopped, and the calculated first rotation speed Np1 and second rotation speed Np2 are compared with each other (step S130).

When the first rotation speed Np1 is higher than or equal to the second rotation speed Np2, it is determined whether a value (Np1−Np2) obtained by subtracting the second rotation speed Np2 from the first rotation speed Np1 is larger than a threshold Npref (step S140). The threshold Npref is determined in advance as an upper limit value of the allowable range in which the difference between the first rotation speed Np1 and the second rotation speed Np2 is allowed due to, for example, sensor errors during normal times when there is no malfunction in the one-way clutch CL1, the planetary gear 30 or the reduction gear 35 or a value close to the upper limit value, and may be set to, for example, 400 rpm, 500 rpm, 600 rpm, or the like. Therefore, during normal times when there is no malfunction in the one-way clutch CL1, the planetary gear 30 or the reduction gear 35, a value (Np1−Np2) obtained by subtracting the second rotation speed Np2 from the first rotation speed Np1 is smaller than or equal to the threshold Npref. In this case, a malfunction counter CW for the one-way clutch CL1 or the pinion gears 33 is cleared to zero (step S150), and then the process returns to step S100. On the other hand, when it is determined in step S130 that the first rotation speed Np1 is lower than the second rotation speed Np2, it is determined whether the value (Np1−Np2) obtained by subtracting the second rotation speed Np2 from the first rotation speed Np is smaller than a threshold −Npref (step S280). The threshold −Npref is obtained by multiplying the above-described threshold Npref by −1. During normal times when there is no malfunction in the one-way clutch CL1, the planetary gear 30 or the reduction gear 35, the value (Np1−Np2) obtained by subtracting the second rotation speed Np2 from the first rotation speed Np1 is larger than or equal to the threshold −Npref (the absolute value of (Np1−Np2) is smaller than or equal to Npref). In this case, a malfunction counter CR for the reduction gear 35 is cleared to zero (step S290), and the process returns to step S100. Therefore, during normal times when there is no malfunction in the one-way clutch CL1, the planetary gear 30 or the reduction gear 35, step S100 to step S150, step S280 and step S290 are repeatedly executed while the motor double-drive mode is being continued.

Figure 4:
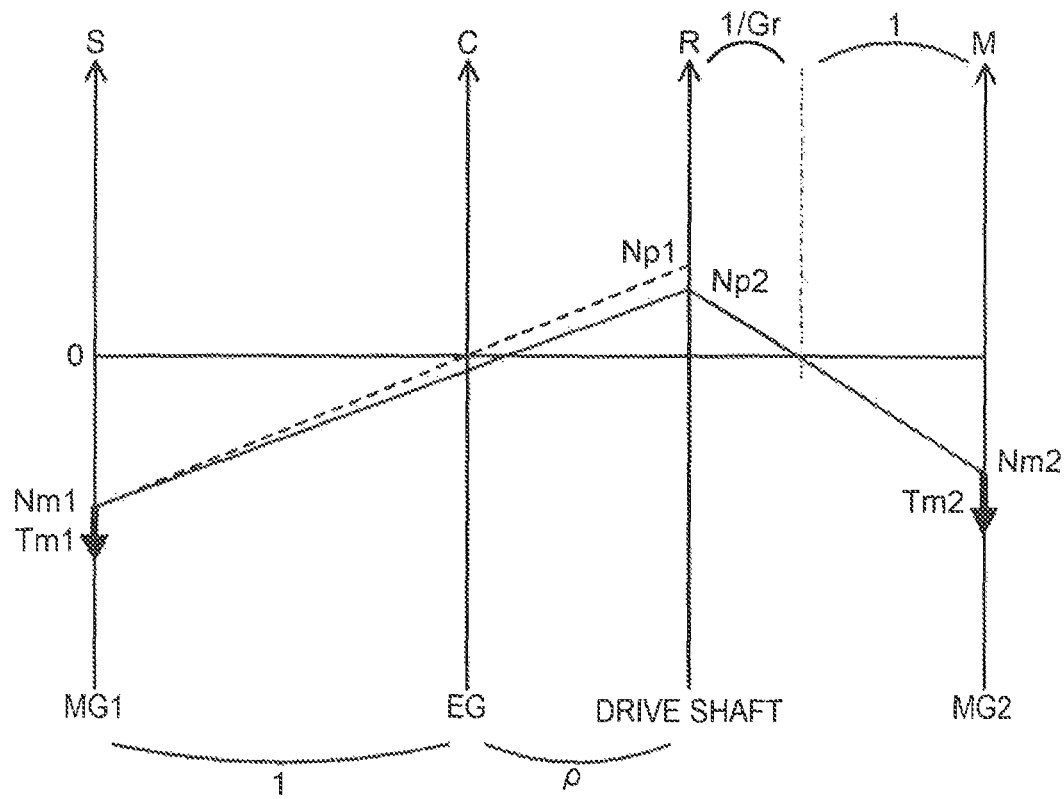
FIG. 4 is a view that illustrates an example of a nomograph at the time when there is a malfunction (release malfunction) in a clutch function of a one-way clutch.
Figure 5:
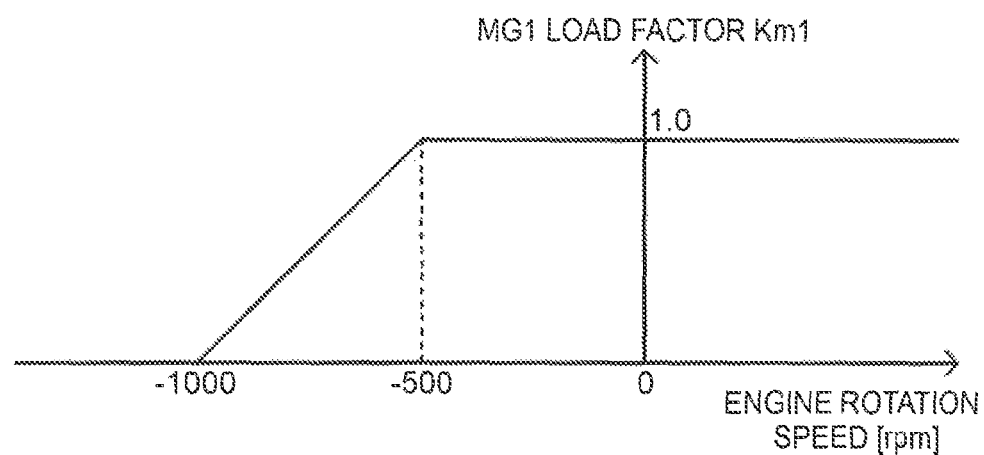
FIG. 5 is a view that illustrates an example of a load factor of a motor versus a rotation speed of an engine.

When it is determined in step S140 that the value (Np1−Np2) obtained by subtracting the second rotation speed Np2 from the first rotation speed Np1 is larger than the threshold Npref, the malfunction counter CW for the one-way clutch CL1 or the pinion gears 33 is counted up by 1 (step S160). Then, it is determined whether the malfunction counter CW is larger than the threshold CWref (step S170). When the malfunction counter CW is smaller than or equal to the threshold CWref, the process returns to step S100. Therefore, when a state where the value (Np1−Np2) obtained by subtracting the second rotation speed Np2 from the first rotation speed Np1 is larger than the threshold Npref is continued, step S100 to step S170 are repeated until the malfunction counter CW becomes larger than the threshold CWref. The threshold CWref varies depending on the frequency (time interval) of repetition of the above-described step S100 to step S170, and a counter value corresponding to two seconds, three seconds, or the like, is used as an elapsed time. FIG. 4 shows an example of a nomograph at the time when there is a malfunction (release malfunction) in the clutch function of the one-way clutch CL1. In the graph, the dashed line shows a state where the first rotation speed Np1 is calculated as the rotation speed of the drive shaft 36 from the rotation speed Nm1 of the motor MG1 on the assumption that the rotation speed Ne of the engine 22 is zero. In FIG. 4, since there is a malfunction (release malfunction) in the clutch function of the one-way clutch CL1, the rotation speed of the engine 22 is a negative rotation speed; however, the rotation speed of the drive shaft 36 is calculated on the basis of the rotation speed Nm1 of the motor MG1 on the assumption that the rotation speed Ne of the engine 22 is zero, so the first rotation speed Np1 is higher than the second rotation speed Np2 calculated from the actual rotation speed of the drive shaft 36 or the rotation speed Nm2 of the motor MG2. In the first embodiment, when it is determined that the value (Np1−Np2) obtained by subtracting the second rotation speed Np2 from the first rotation speed Np1 is larger than the threshold Npref, the load factor Km1 of the motor MG is set so as to decrease as the rotation speed of the engine 22 decreases (the absolute value of the rotation speed Ne increases) in order to prevent the engine 22 from rotating in the reverse direction at high speed. FIG. 5 shows an example of the load factor Km1 of the motor MG1 versus the rotation speed Ne of the engine 22. The load factor Km1 is used to be multiplied by the torque command Tm1* of the motor MG1. In the example shown in FIG. 5, since the load factor Km1 is set so as to linearly vary from 1.0 to 0 within the range from −500 rpm to −1000 rpm of the engine 22 on the reverse rotation side, the engine 22 does not rotate at a rotation speed higher than 1000 rpm on the reverse rotation side.

When it is determined that the malfunction counter CW is larger than the threshold CWref, it is determined that there is a malfunction in the one-way clutch CL1 or the pinion gears 33 of the planetary gear 30 (step S180), and the motor double-drive mode is prohibited (step S190). As shown in FIG. 4, if the hybrid vehicle 20 travels in the motor double-drive mode at the time when there is a malfunction in the one-way clutch CL1, there is a concern that the engine 22 rotates in the reverse direction and a component breaks due to the reverse rotation of the engine 22. For this reasons, the hybrid vehicle 20 is prohibited from traveling in the motor double-drive mode. When the dashed line in FIG. 4 indicates a state where there is a malfunction in the pinion gears 33 (malfunction that the pinion gears 33 idle), FIG. 4 shows an example of a nomograph at the time when there occurs a malfunction in the pinion gears 33 (malfunction that the pinion gears 33 idle). As the pinion gears 33 idle, the absolute value of the rotation speed Nm1 of the motor MG1 increases, so the first rotation speed Np1 becomes higher than the second rotation speed Np2. In this way, when the hybrid vehicle 20 travels in the motor double-drive mode at the time when there is a malfunction in the pinion gears 33, torque from the motor MG1 cannot be transmitted to the drive shaft 36 due to idling of the pinion gears 33. For this reason, the hybrid vehicle 20 is prohibited from traveling in the motor double-drive mode.

Figure 6:
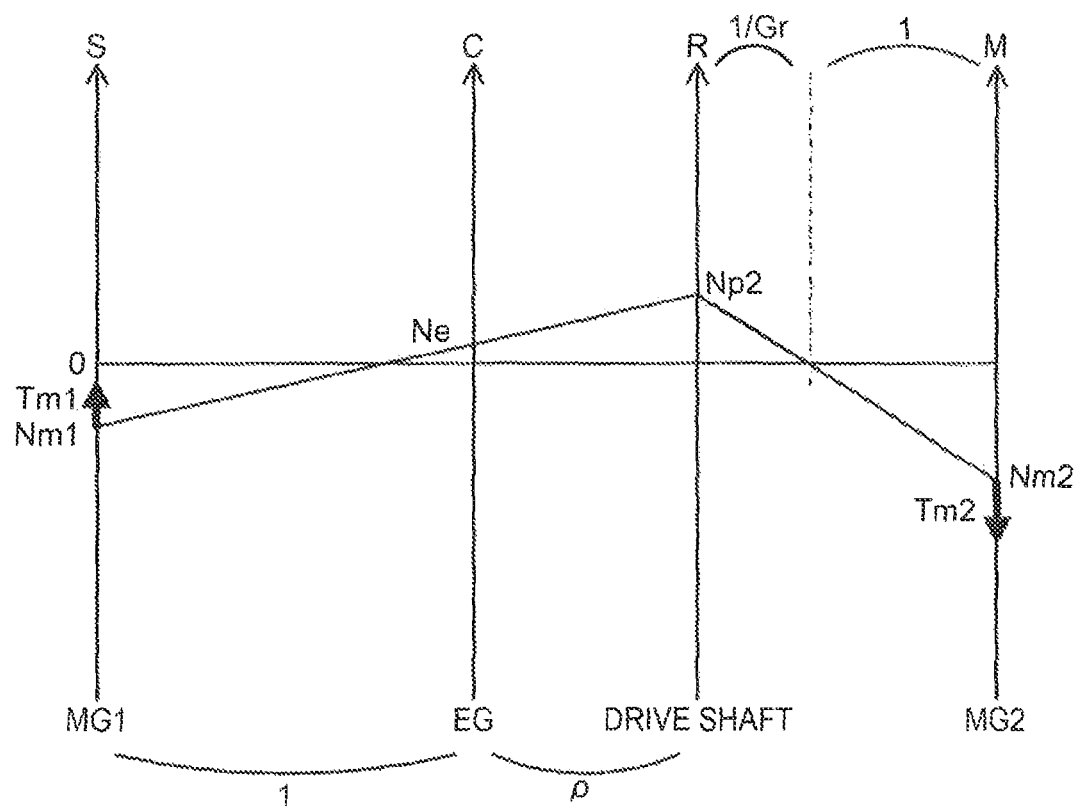
FIG. 6 is a view that illustrates an example of a nomograph at the time when the engine is being started.

When the motor double-drive mode is prohibited since there is a malfunction in the one-way clutch CL1 or the pinion gears 33, a start of the engine 22 is waited (step S200). As the engine 22 is started, the rotation speeds Nm1, Nm2 of the motors MG1, MG2 at the start of the engine and the rotation speed Ne of the engine 22 are input (step S210). The rotation speed Ne of the engine 22 may be computed on the basis of the crank angle θcr from the crank position sensor 23, and may be input from the engine ECU 24 via communication. A calculated rotation speed Nec as the rotation speed of the engine 22 is calculated on the basis of the input rotation speeds Nm1, Nm2 of the motors MG1, MG2 (step S220). FIG. 6 shows an example of a nomograph at the time when the engine 22 is being started. The calculated rotation speed Nec is allowed to be obtained through proportional calculation {(Np2+ρ×Nm1)/(1+ρ)} by using the rotation speed Nm1 of the motor MG1, the second rotation speed Np2 and the gear ratio ρ of the planetary gear 30. Since the second rotation speed Np2 is a product (Nm2/Gr) of the rotation speed Nm2 of the motor MG2 and the inverse of the gear ratio Gr of the reduction gear 35, the calculated rotation speed Nec is {(Nm2/Gr+ρ×Nm1)/(1+ρ)}.

It is determined whether the absolute value of the difference between the rotation speed Ne of the engine 22 and the calculated rotation speed Nec is smaller than or equal to the threshold Neref (step S230). The threshold Neref is determined in advance as an upper limit value of an allowable range due to sensor errors, or the like, or a value close to the upper limit value. When the absolute value of the difference between the rotation speed Ne of the engine 22 and the calculated rotation speed Nec is smaller than or equal to the threshold Neref, it is determined that the rotation speed Ne of the engine 22 is normally increasing, and it is determined that there is a malfunction in the one-way clutch CL1 (step S240). In the case of a malfunction in the one-way clutch CL1 (a malfunction in the clutch function), only restriction on the reverse rotation side of the engine 22 cannot be performed; however, there is no interference in operation on the forward rotation side of the engine 22. Therefore, the hybrid vehicle is able to travel in the motor single-drive mode or the HV drive mode, the motor single-drive mode and the HV drive mode are permitted (step S250), after which the routine is ended.

On the other hand, when the absolute value of the difference between the rotation speed Ne of the engine 22 and the calculated rotation speed Nec is larger than the threshold Neref it is determined that the rotation speed Ne of the engine 22 is not normally increasing, and it is determined that there is a malfunction in the pinion gears 33 (step S260). In the case of a malfunction in the pinion gears 33 (idling malfunction), the rotation speed Ne of the engine 22 does not increase because the pinion gears 33 idle, with the result that the difference between the rotation speed Ne and the calculated rotation speed Nec increases. In this case, it is not possible to transmit the torque of the motor MG1, so it is also not possible to start the engine 22. Therefore, the hybrid vehicle 20 is able to travel in only the motor single-drive mode, so only the motor single-drive mode is permitted (step S270), after which the routine is ended.

Figure 7:
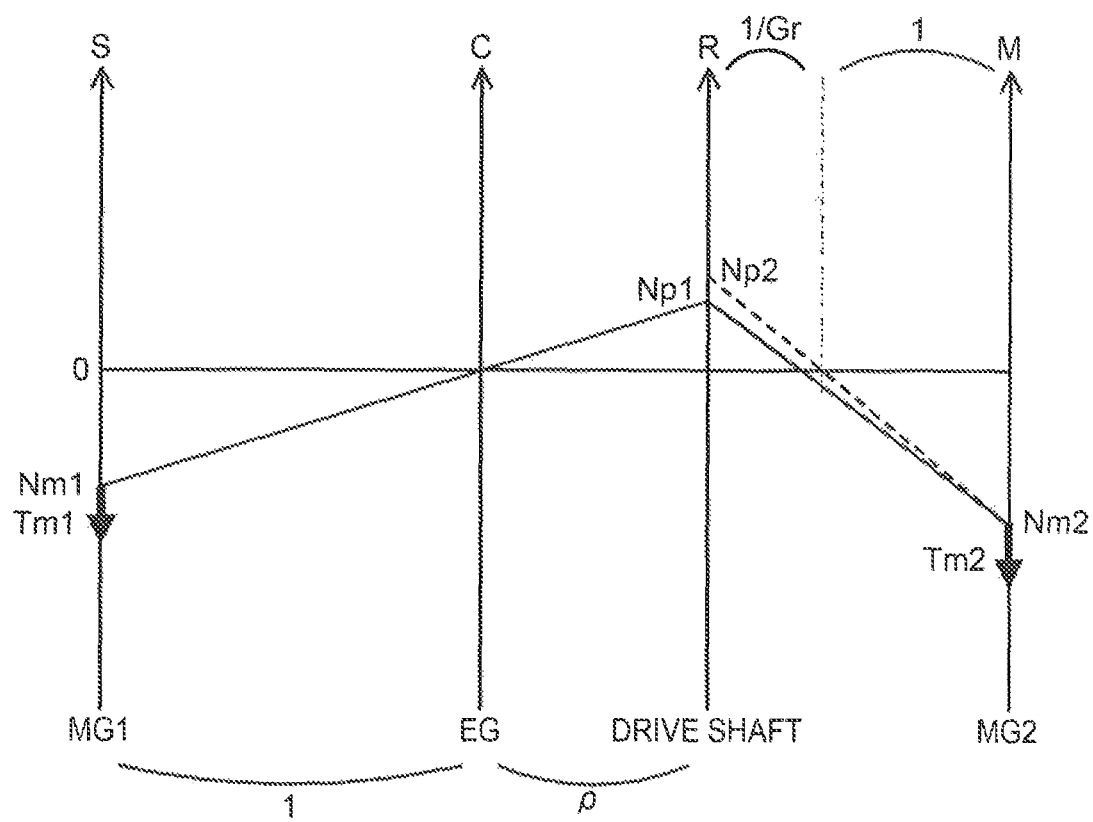
FIG. 7 is a view that illustrates an example of a nomograph at the time when there is a malfunction in a reduction gear.

When it is determined in step S280 that the value (Np1−Np2) obtained by subtracting the second rotation speed Np2 from the first rotation speed Np1 is smaller than the threshold (−Npref) (the absolute value of (Np1−Np2) is larger than Npref), the malfunction counter CR for the reduction gear 35 is counted up by 1 (step S300). It is determined whether the malfunction counter CR is larger than a threshold CRref (step S310). When the malfunction counter CR is smaller than or equal to the threshold CRref, the process returns to step S100. Therefore, when the state where the value (Np1−Np2) obtained by subtracting the second rotation speed Np2 from the first rotation speed Np1 is smaller than the threshold (−Npref) (larger in absolute value) continues, step S100 to step S130, step S280 and step S300 are repeated until the malfunction counter CR becomes larger than the threshold CRref. The threshold CRref varies depending on the frequency (time interval) of repetition of the above-described step S100 to step S130, step S280 and step S300, and a counter value corresponding to two seconds, three seconds, or the like, is used as an elapsed time. FIG. 7 shows an example of a nomograph at the time when there is a malfunction in the reduction gear 35. In the graph, the dashed line shows a state where the second rotation speed Np2 as the rotation speed of the drive shaft 36 is calculated from the rotation speed Nm2 of the motor MG2 on the assumption that the reduction gear 35 is normal. In FIG. 7, since there is a malfunction in the reduction gear 35, the second rotation speed Np2 is higher than the actual rotation speed of the drive shaft 36 or the first rotation speed Np1 calculated from the rotation speed Nm1 of the motor MG1.

When it is determined that the malfunction counter CR is larger than the threshold CRref, it is determined that there is a malfunction in the reduction gear 35 (step S320), the engine motor drive mode in which the hybrid vehicle 20 travels by using power from the engine 22 and torque from the motor MG1 and the MG1 single-drive mode in which the hybrid vehicle 20 travels by using torque from only the motor MG1 are permitted only (step S330), after which the routine is ended. When there is a malfunction in the reduction gear 35, it is not possible to transmit torque from the motor MG2 to the drive shaft 36, so it is required to prohibit the motor double-drive mode, the HV drive mode and the motor single-drive mode with the use of the motor MG2. On the other hand, it is possible to output torque from the motor MG1 to the drive shaft 36 when reaction force is obtained by using the one-way clutch CL1, and it is possible to output power from the engine 22 to the drive shaft 36 when reaction force is obtained by using the motor MG1. For this reason, only the engine motor drive mode in which the hybrid vehicle 20 travels by using power from the engine 22 and torque from the motor MG1 is permitted.

With the above-described hybrid vehicle 20 according to the first embodiment, in the motor double-drive mode, on the assumption that the rotation speed Ne of the engine 22 is zero, the first rotation speed Np1 as the rotation speed of the drive shaft 36 is calculated from the rotation speed Nm1 of the motor MG1, and the second rotation speed Np2 as the rotation speed of the drive shaft 36 is calculated from the rotation speed Nm2 of the motor MG2. The state where the value (Np1−Np2) obtained by subtracting the second rotation speed Np2 from the first rotation speed Np1 is larger than the threshold Npref is continued, and, when the malfunction counter CW becomes larger than the threshold CWref, it is determined that there is a malfunction in the one-way clutch CL1 or the pinion gears 33 of the planetary gear 30. When the determination is made in this way, at the time of the next start of the engine 22, it is determined that there is a malfunction in the one-way clutch CL1 when the rotation speed Ne of the engine 22 is normally increasing, and it is determined that there is a malfunction in the pinion gears 33 when the rotation speed Ne of the engine 22 is not normally increasing. The state where the value (Np1−Np2) obtained by subtracting the second rotation speed Np2 from the first rotation speed Np1 is smaller than the threshold (−Npref) (larger in absolute value) continues, and when the malfunction counter CR becomes larger than the threshold CRref, it is determined that there is a malfunction in the reduction gear 35. In this way, it is possible to properly determine a malfunction in the one-way clutch CL1, a malfunction in the pinion gears 33 or a malfunction in the reduction gear 35.

With the hybrid vehicle 20 according to the first embodiment, when it is determined that there is a malfunction in the one-way clutch CL1 or the pinion gears 33, the motor double-drive mode is prohibited. When it is determined that there is a malfunction in the one-way clutch CL1, the motor single-drive mode and the HV drive mode are permitted. When it is determined that there is a malfunction in the pinion gears 33, only the motor single-drive mode is permitted. When it is determined that there is a malfunction in the reduction gear 35, only the engine motor drive mode in which the hybrid vehicle 20 travels by using power from the engine 22 and torque from the motor MG1 is permitted. In this way, by prohibiting or permitting the drive modes, it is possible to ensure traveling even when there is a malfunction in the one-way clutch CL1, the pinion gears 33, or the reduction gear 35.

In the hybrid vehicle 20 according to the first embodiment, the reduction gear 35 is provided. Instead, the motor MG2 may be directly connected to the drive shaft 36 without providing the reduction gear 35. In this case, the processes of step S280 to step S330 in the malfunction detection process routine shown in FIG. 2 are unnecessary.

Figure 8:
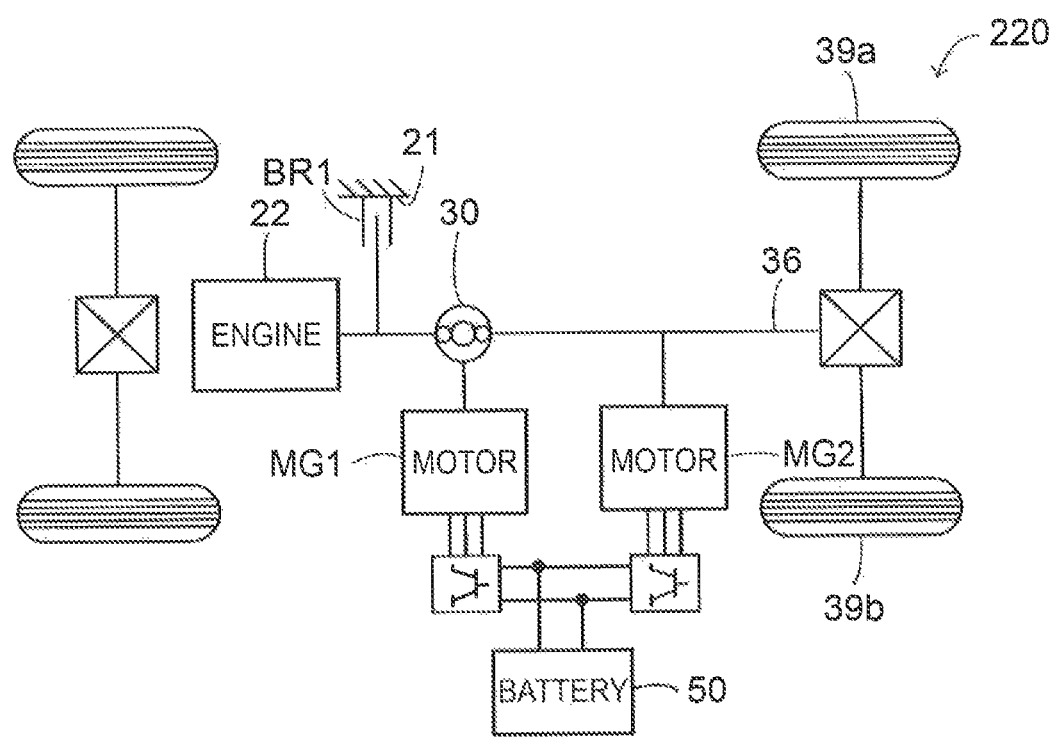
FIG. 8 is a configuration view that schematically shows the configuration of a hybrid vehicle according to a second embodiment.

In the hybrid vehicle 20 according to the first embodiment, the one-way clutch CL1 is connected to the carrier 34. Instead, as illustrated in a hybrid vehicle 220 according to a second embodiment shown in FIG. 8, a brake BR1 may be connected to the carrier 34. The brake BR1 fixes (connects) the carrier 34 to the case 21 such that the carrier 34 is non-rotatable, or releases the carrier 34 from the case 21 such that the carrier 34 is rotatable. In this case, in the motor double-drive mode, basically, the hybrid vehicle 220 travels while the carrier 34 is fixed by engaging the brake BR1. For this reason, in the malfunction detection process routine shown in FIG. 2, a malfunction in the one-way clutch CL1 may be regarded as a malfunction in the brake BR1.

In the hybrid vehicle 20 according to the first embodiment, the single planetary gear 30 and the reduction gear 35 are provided as the planetary gear train. Instead, two or more planetary gears may be provided as the planetary gear train. In this case, a hybrid vehicle 320 according to a third embodiment shown in FIG. 9 may be employed.

Figure 9:
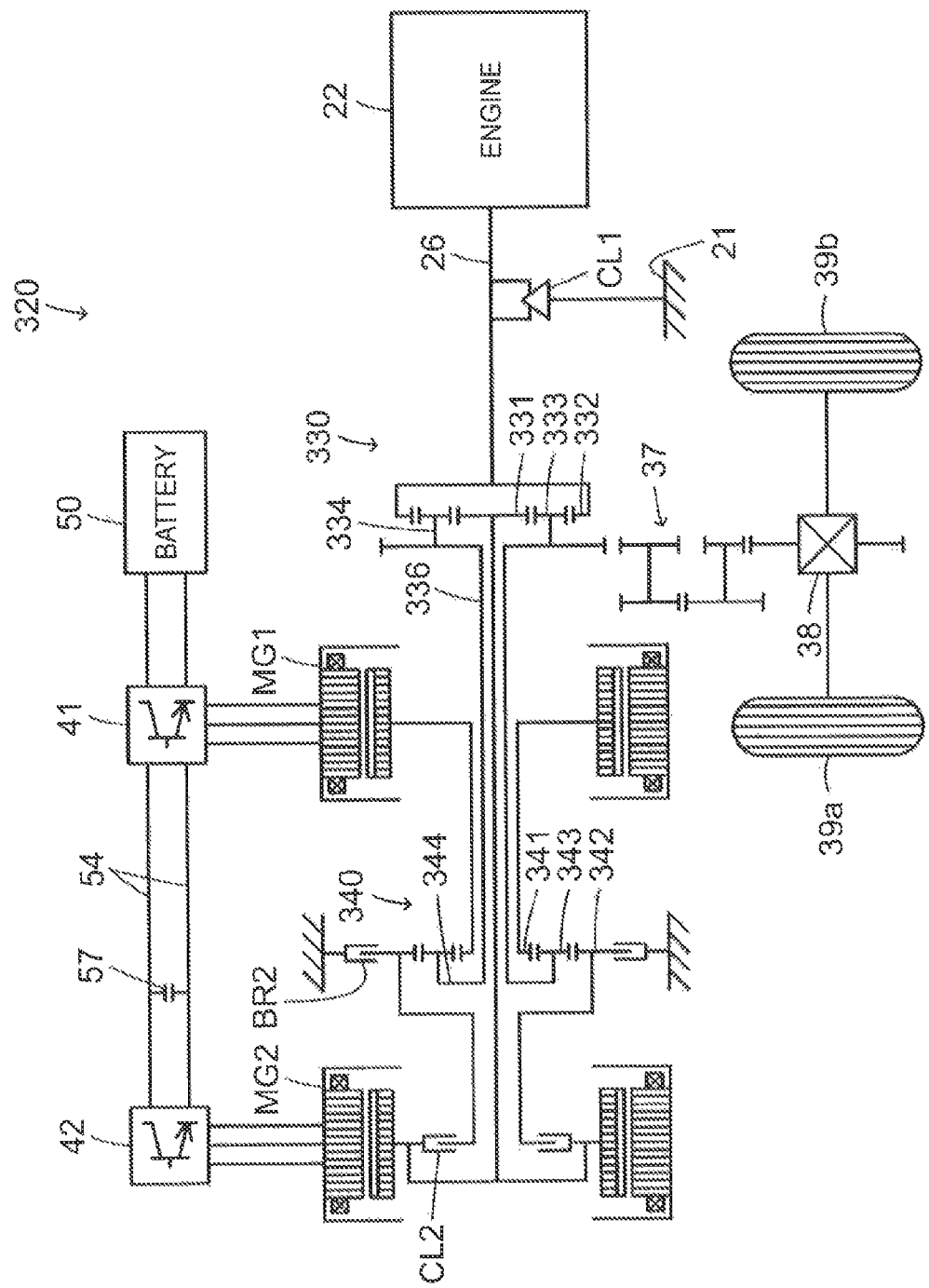
FIG. 9 is a configuration view that schematically shows the configuration of a hybrid vehicle according to a third embodiment.

The hybrid vehicle 320 according to the third embodiment shown in FIG. 9 includes planetary gears 330, 340 instead of the planetary gear 30 of the hybrid vehicle 20 as the planetary gear train, and also includes a clutch CL2 and a brake BR2.

The planetary gear 330 is a single pinion planetary gear. The planetary gear 330 includes a sun gear 331, a ring gear 332, a plurality of pinion gears 333 and a carrier 334. The sun gear 331 is an external gear. The ring gear 332 is an internal gear. The plurality of pinion gears 333 are in mesh with the sun gear 331 and the ring gear 332. The carrier 334 supports the plurality of pinion gears 333 such that each pinion gear 333 is rotatable and revolvable. The rotor of the motor MG2 is connected to the sun gear 331. The crankshaft 26 of the engine 22 is connected to the ring gear 332. A drive shaft 336 coupled to the drive wheels 39a, 39b via the differential gear 38 and the gear mechanism 37 is connected to the carrier 334.

The planetary gear 340 is a single pinion planetary gear. The planetary gear 340 includes a sun gear 341, a ring gear 342, a plurality of pinion gears 343 and a carrier 344. The sun gear 341 is an external gear. The ring gear 342 is an internal gear. The plurality of pinion gears 343 are in mesh with the sun gear 341 and the ring gear 342. The carrier 344 supports the plurality of pinion gears 343 such that each pinion gear 343 is rotatable and revolvable. The rotor of the motor MG1 is connected to the sun gear 341. The drive shaft 336 is connected to the carrier 344.

The clutch CL2 connects the sun gear 331 of the planetary gear 330 and the rotor of the motor MG2 to the ring gear 342 of the planetary gear 340 or releases the connection therebetween. The brake BR2 fixes (connects) the ring gear 342 of the planetary gear 340 to the case 21 such that the ring gear 342 is non-rotatable, or releases the ring gear 342 from the case 21 such that the ring gear 342 is rotatable.

Figure 10:
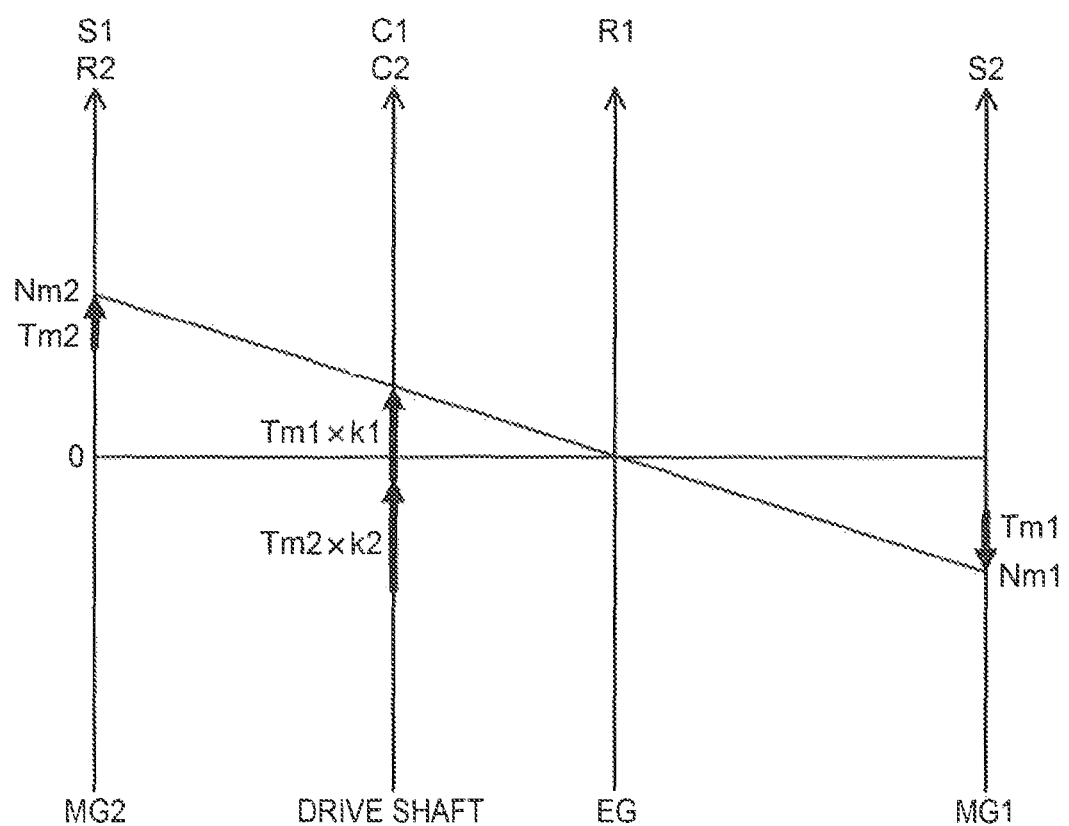
FIG. 10 is a view that illustrates an example of a nomograph at the time when the hybrid vehicle travels in motor double-drive mode in a state where a clutch is set to an engaged state and a brake is set to a released state.
Figure 11:
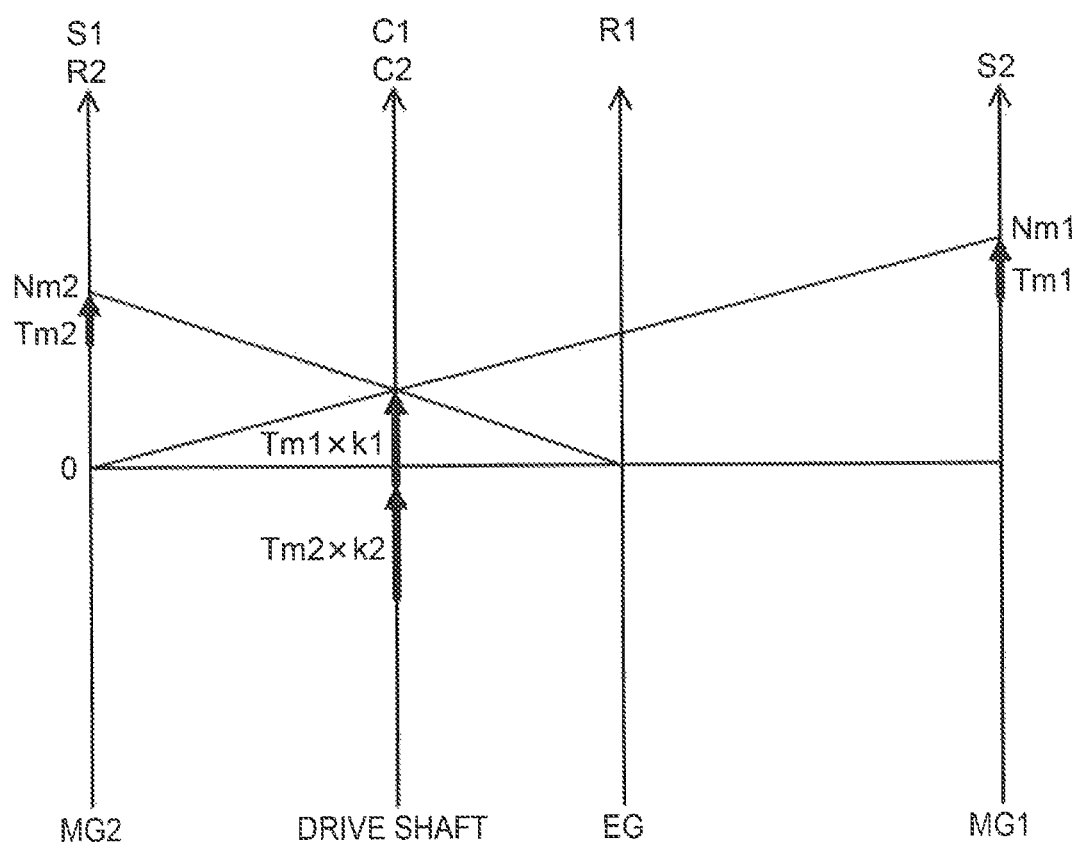
FIG. 11 is a view that illustrates an example of a nomograph at the time when the hybrid vehicle travels in the motor double-drive mode in a state where the clutch is set to a released state and the brake is set to an engaged state.

FIG. 10 is a view that shows an example of a nomograph of the planetary gears 330, 340 at the time when the hybrid vehicle 320 travels in the motor double-drive mode in a state where the clutch CL2 is set to the engaged state and the brake BR2 is set to the released state. FIG. 11 is a view that illustrates an example of a nomograph of the planetary gears 330, 340 at the time when the hybrid vehicle 320 travels in the motor double-drive mode in a state where the clutch CL2 is set to the released state and the brake BR2 is set to the engaged state. In FIG. 10 and FIG. 11, the S1 and R2-axis represents the rotation speed of the sun gear 331 of the planetary gear 330, the rotation speed of the ring gear 342 of the planetary gear 340, and the rotation speed Nm2 of the motor MG2. The C1 and C2-axis represents the rotation speeds of the carriers 334, 344 of the planetary gears 330, 340 and the rotation speed of the drive shaft 336. The R1-axis represents the rotation speed of the ring gear 332 of the planetary gear 330 and the rotation speed Ne of the engine 22. The S2-axis represents the rotation speed of the sun gear 341 of the planetary gear 340 and the rotation speed Nm1 of the motor MG1. In FIG. 10 and FIG. 11, the two wide-line arrows in the C1 and C2-axis respectively indicate a torque (Tm1×k1) that is output to the drive shaft 336 at the time when the torque Tm1 is output from the motor MG1 and a torque (Tm2×k2) that is output to the drive shaft 336 at the time when the torque Tm2 is output from the motor MG2. A conversion coefficient k1 is a coefficient for converting the torque Tm1 of the motor MG1 to the torque of the drive shaft 336. A conversion coefficient k2 is a coefficient for converting the torque Tm2 of the motor MG2 to the torque of the drive shaft 336.

In the case of FIG. 10, the clutch CL2 is set to the engaged state, so the rotation speed of the sun gear 331 of the planetary gear 330, which is the rotation speed Nm2 of the motor MG2, is the same as the rotation speed of the ring gear 342 of the planetary gear 340. Therefore, the planetary gears 330, 340 function as a so-called four element planetary gear train. In this case, in the motor double-drive mode, the torque Tm1 in the direction in which the rotation speed Nm1 of the motor MG1 is increased toward a negative side (downward direction in the graph) is output from the motor MG1 to the sun gear 341 of the planetary gear 340, and the torque Tm2 in the direction in which the rotation speed Nm2 of the motor MG2 is increased toward a positive side (upward direction in the graph) is output from the motor MG2 to the sun gear 331 of the planetary gear 330 and the ring gear 342 of the planetary gear 340. Thus, the hybrid vehicle 320 is able to travel by using torque from the motor MG1 and the motor MG2 while the ring gear 332 (engine 22) of the planetary gear 330 is placed in the rotation stopped state.

In the case of FIG. 11, in the motor double-drive mode, the torque Tm1 in the direction in which the rotation speed Nm1 of the motor MG1 is increased toward a positive side (upward direction in the graph) is output from the motor MG1 to the sun gear 341 of the planetary gear 340, and the torque Tm2 in the direction in which the rotation speed Nm2 of the motor MG2 is increased toward a positive side (upward direction in the graph) is output from the motor MG2 to the sun gear 331 of the planetary gear 330 and the ring gear 342 of the planetary gear 340. Thus, the hybrid vehicle 320 is able to travel by using torque from the motor MG1 and the motor MG2 while the ring gear 332 (engine 22) of the planetary gear 330 is placed in the rotation stopped state.

Figure 12:
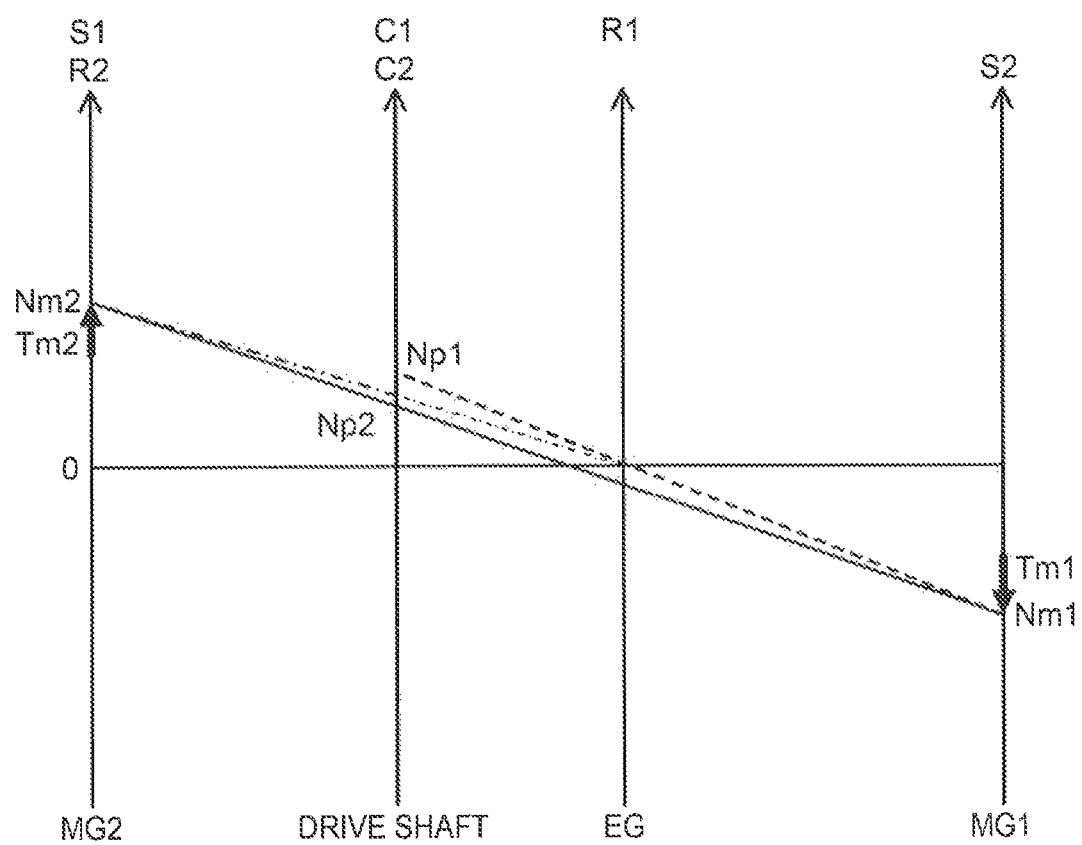
FIG. 12 is a view that illustrates an example of a nomograph at the time when there occurs a malfunction in the one-way clutch in the state shown in FIG. 10.

FIG. 12 is a view that illustrates an example of a nomograph at the time when there occurs a malfunction in the one-way clutch CL1 in a state (state shown in FIG. 10) where the hybrid vehicle 320 is traveling in the motor double-drive mode while the clutch CL2 is set to the engaged state and the brake BR2 is set to the released state. In the graph, the continuous line shows a state where there is a malfunction in the one-way clutch CL1. The dashed line shows a state where the first rotation speed Np1 as the rotation speed of the drive shaft 336 is calculated from the rotation speed Nm1 of the motor MG1 on the assumption that the rotation speed Ne of the engine 22 is zero. The alternate long and short dashed line shows a state where the second rotation speed Np2 as the rotation speed of the drive shaft 336 is calculated from the rotation speed Nm2 of the motor MG2 on the assumption that the rotation speed Ne of the engine 22 is zero. As shown in the graph, when there is a malfunction in the one-way clutch CL1, the first rotation speed Np1 is higher than the second rotation speed Np2. For this reason, in the motor double-drive mode in the state shown in FIG. 10 in the hybrid vehicle 320 according to the third embodiment as well, it is possible to determine whether there is a malfunction in the one-way clutch CL1 by using the processes of step S100 to step S190 in the malfunction detection process routine shown in FIG. 2.

Figure 13:
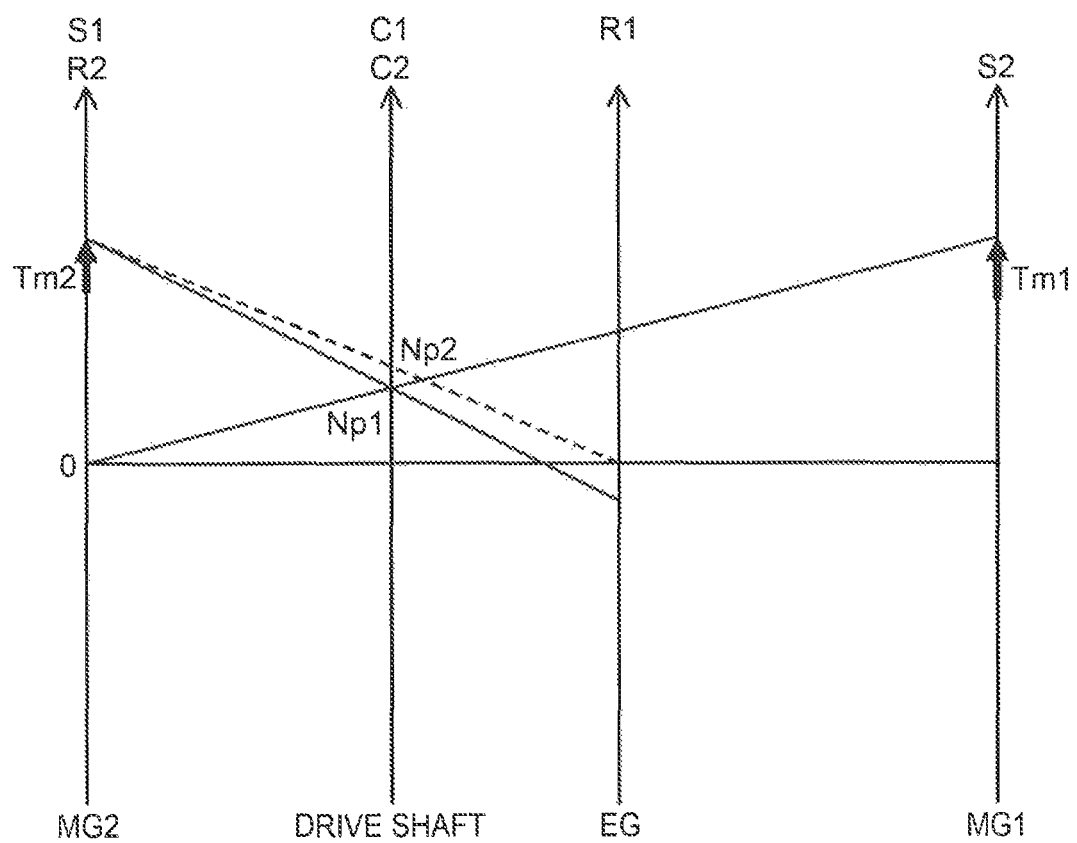
FIG. 13 is a view that illustrates an example of a nomograph at the time when there occurs a malfunction in the one-way clutch in the state shown in FIG. 11.

FIG. 13 is a view that illustrates an example of a nomograph at the time when there occurs a malfunction in the one-way clutch CL in a state (state shown in FIG. 11) where the hybrid vehicle 320 is traveling in the motor double-drive mode while the clutch CL2 is set to the released state and the brake BR2 is set to the engaged state. In the graph, the continuous line shows a state where there is a malfunction in the one-way clutch CL1. The dashed line shows a state where the second rotation speed Np2 as the rotation speed of the drive shaft 336 is calculated from the rotation speed Nm2 of the motor MG2 on the assumption that the rotation speed Ne of the engine 22 is zero. As shown in the graph, when there is a malfunction in the one-way clutch CL, the first rotation speed Np1 is lower than the second rotation speed Np2. For this reason, in the motor double-drive mode in the state shown in FIG. 11 in the hybrid vehicle 320 according to the alternative embodiment, it is possible to determine whether there is a malfunction in the one-way clutch CL1 by interchanging the first rotation speed Np1 and the second rotation speed Np2 in the processes of step S100 to step S190 in the malfunction detection process routine shown in FIG. 2.

The correspondence relationship between the major elements of the embodiments and the major elements described in the summary will be described. In the embodiments, the engine 22 corresponds to the engine, the motor MG1 corresponds to the first motor, the motor MG2 corresponds to the second motor, the planetary gear 30 and the reduction gear 35 correspond to the planetary gear train, the one-way clutch CL1 corresponds to the rotation restriction mechanism, the battery 50 corresponds to the battery, a combination of the engine ECU 24, the motor ECU 40 and the HV-ECU 70 corresponds to the electronic control unit, and the HV-ECU 70 that executes the malfunction detection process routine shown in FIG. 2 corresponds to the electronic control unit.

As for the correspondence relationship between the major elements of the embodiments and the major elements described in the summary, each embodiment is an example for specifically illustrating a mode for carrying out the present disclosure, described in the summary. Each embodiment is not intended to limit the elements of the present disclosure described in the summary. That is, the present disclosure described in the summary should be interpreted on the basis of the description in the summary, and each embodiment is merely a specific example of the present disclosure described in the summary.

The embodiments of the present disclosure are described above; however, the present disclosure is not limited to those embodiments. Of course, the present disclosure may be implemented in various forms without departing from the scope of the present disclosure.

The present disclosure is applicable to manufacturing industries of hybrid vehicles, or the like.

What is claimed is:

1. A hybrid vehicle comprising:
an engine;
a first motor;
a second motor,
a planetary gear train including at least one planetary gear, rotating elements of the planetary gear train being connected to the engine, the first motor, the second motor and a drive shaft coupled to an axle;
a rotation restriction mechanism configured to restrict rotation of the engine;
a battery configured to exchange electric power with the first motor and the second motor; and
an electronic control unit configured to
i) in double-drive mode in which the hybrid vehicle travels by using torque from the first motor and the second motor in a state where the rotation of the engine is restricted, control the first motor and the second motor such that a required torque that is required for the drive shaft is output from the first motor and the second motor to the drive shaft, and ii) in the double-drive mode, when a deviation between a first rotation speed of the drive shaft and a second rotation speed of the drive shaft is larger than a threshold, determine that there is a malfunction in any one of the planetary gear train and the rotation restriction mechanism, the first rotation speed being calculated from a rotation speed of the first motor at the time when the rotation of the engine is restricted, and the second rotation speed being calculated from a rotation speed of the second motor.

2. The hybrid vehicle according to claim 1, wherein
the planetary gear train includes a single pinion planetary gear,
the single pinion planetary gear includes a sun gear coupled to the first motor, a ring gear coupled to the drive shaft, and a carrier coupled to a plurality of pinion gears and coupled to the engine, and
the electronic control unit is configured to, when the first rotation speed is higher than the second rotation speed by the threshold or more, determine that there is a malfunction in the rotation restriction mechanism or the pinion gears.

3. The hybrid vehicle according to claim 2, wherein
the rotation restriction mechanism is a one-way clutch that permits forward rotation of the engine and does not permit reverse rotation of the engine, and
the electronic control unit is configured to, at the time when the electronic control unit starts the engine after determining that there is a malfunction in any one of the rotation restriction mechanism and the pinion gears, i) determine that there is a malfunction in the one-way clutch when a difference between a rotation speed, calculated from the rotation speed of the first motor and the rotation speed of the second motor, and a rotation speed of the engine is smaller than or equal to a predetermined difference, and ii) determine that there is a malfunction in the pinion gears when the difference is larger than the predetermined difference.

4. The hybrid vehicle according to claim 3, wherein
the electronic control unit is configured to
i) when the electronic control unit determines that there is a malfunction in the one-way clutch, permit hybrid mode and single-drive mode, the hybrid mode is a mode in which the hybrid vehicle travels by using power from the engine and torque from the first motor and the second motor while the double-drive mode is prohibited, the single-drive mode is a mode in which the hybrid vehicle travels by using torque from only the second motor while the engine is placed in a rotation stopped state, and
ii) when the electronic control unit determines that there is a malfunction in the pinion gears, permit the single-drive mode while the double-drive mode and the hybrid mode are prohibited.

5. The hybrid vehicle according to claim 2, wherein
the planetary gear train includes a reduction gear coupled to the second motor and the ring gear, and
the electronic control unit is configured to, when the first rotation speed is lower than the second rotation speed by the threshold or more, determine that there is a malfunction in the reduction gear.

6. The hybrid vehicle according to claim 5, wherein
the electronic control unit is configured to, when the electronic control unit determines that there is a malfunction in the reduction gear, prohibit a drive mode except an engine motor drive mode and a first motor single-drive mode, the engine motor drive mode is a mode in which the hybrid vehicle travels by using power from the engine and torque from the first motor, the first motor single-drive mode is a mode in which the hybrid vehicle travels by using torque from only the first motor.

* * * * *